US009508205B1

(12) United States Patent
Calmettes et al.

(10) Patent No.: US 9,508,205 B1
(45) Date of Patent: Nov. 29, 2016

(54) METHOD, APPARATUS, AND COMPUTER-READABLE MEDIUM FOR ENROLLMENT

(71) Applicant: Paychex Time & Attendance, Inc., Rochester, NY (US)

(72) Inventors: Korey R. Calmettes, Banks, OR (US); Shanon Melling, Scappoose, OR (US)

(73) Assignee: Paychex Time & Attendance, Inc., Rochester, NY (US)

( * ) Notice: Subject to any disclaimer, the term of this patent is extended or adjusted under 35 U.S.C. 154(b) by 0 days.

(21) Appl. No.: 14/555,082

(22) Filed: Nov. 26, 2014

(51) Int. Cl.
*G06F 21/32* (2013.01)
*G07C 9/00* (2006.01)

(52) U.S. Cl.
CPC .................................. *G07C 9/00071* (2013.01)

(58) Field of Classification Search
CPC .......... G07C 9/00031; G07C 9/00071; G06F 21/32
USPC ............... 340/5.52, 5.53, 5.54, 5, 82, 83, 84
See application file for complete search history.

(56) References Cited

U.S. PATENT DOCUMENTS 7,489,595 B2 2/2009 King et al.
9,256,719 B2* 2/2016 Berini .................... G06F 21/32
2002/0133725 A1* 9/2002 Roy .................. G06K 9/00006 726/5
2007/0061590 A1* 3/2007 Boye .................... G06F 21/305 713/186
2007/0288320 A1* 12/2007 Cooper ................ G06Q 10/067 705/348
2011/0035338 A1* 2/2011 Kagan .................... G01D 4/002 705/412

OTHER PUBLICATIONS

"Use Touch ID on iPhone and iPad"—http://support.apple.com/en-us/HT5883 (website) Nov. 14, 2014 (5 pages).

* cited by examiner

*Primary Examiner* — Kevin Kim

(74) *Attorney, Agent, or Firm* — Timothy W. Menasco, Esq.; Harter Secrest & Emery LLP

(57) ABSTRACT

Presented are a method, apparatus, and computer-readable medium for enrollment. The method includes receiving, at a user equipment (UE), one of a plurality of predetermined user identifiers, the UE having access to the plurality of predetermined user identifiers stored in a memory, and creating a biometric template corresponding to at least one biometric scan of the user. The method further includes storing the created biometric template, wherein the created biometric template is associated with the one of the plurality of user identifiers.

15 Claims, 6 Drawing Sheets

METHOD, APPARATUS, AND COMPUTER-READABLE MEDIUM FOR ENROLLMENT

BACKGROUND OF THE INVENTION

Field of the Invention

Figure 1:
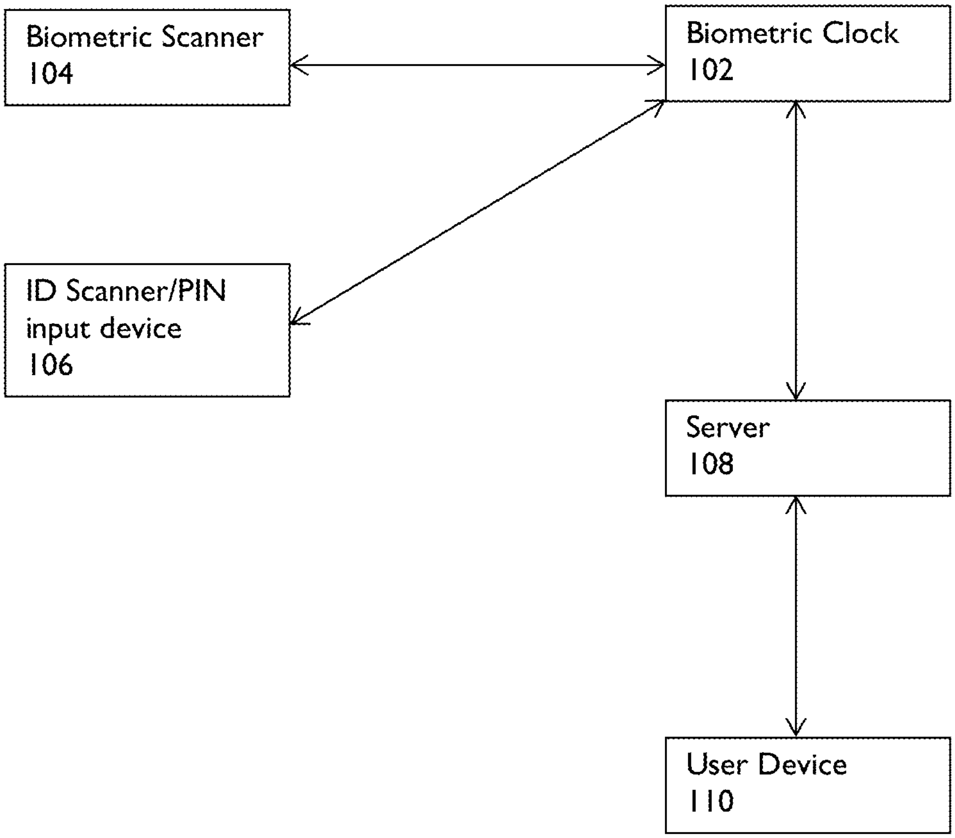

Exemplary embodiments of the present disclosure relate to a method, apparatus, and computer-readable medium for enrollment. Exemplary embodiments of the present disclosure relate more particularly to enrollment of a user without the aid of a third party user.

Description of Related Art

A time clock, sometimes referred to as a clock card machine, punch clock, or time recorder, is a mechanical (or electronic) timepiece used to assist in tracking the hours worked by an employee. A basic time clock will just stamp the date and time on a time card. These clocks will usually be activated by a button that a worker must press to stamp their card. The time cards usually have the work days, "time in", and "time out" areas marked on them so that employees can "punch in" or "punch out" in the correct place. The employee may be responsible for lining up the correct area of the card to be punched or stamped.

Software based time and attendance systems are similar to paper-based systems, but they rely on computers and check-in terminals. They are backed up with software that can be integrated with a human resources department and in some cases payroll software.

Biometrics refers to metrics related to human characteristics and traits. Biometrics authentication can be used as a form of identification. It is also used to identify individuals in groups that are under surveillance.

Biometric identifiers are the distinctive, measurable characteristics used to label and describe individuals. Biometric identifiers are often categorized as physiological versus behavioral characteristics. Physiological characteristics are related to the shape of the body. Examples include, but are not limited to fingerprint, palm veins, face recognition, DNA, palm print, hand geometry, iris recognition, and retinal vessel patterns.

More traditional means of access control include token-based identification systems, such as a driver's license or passport, and knowledge-based identification systems, such as a password or personal identification number. Since biometric identifiers are unique to individuals, they are more reliable in verifying identity than token and knowledge-based methods.

BRIEF SUMMARY OF THE INVENTION

In view of the foregoing, it is an object of the present disclosure to provide a method, apparatus, and computer-readable medium for enrollment.

A first exemplary embodiment of the present disclosure provides a method for enrollment. The method includes receiving, at a user equipment (UE), one of a plurality of predetermined user identifiers, the UE having access to the plurality of predetermined user identifiers stored in a memory, and creating a biometric template corresponding to at least one biometric scan of the user. The method further includes storing the created biometric template, wherein the created biometric template is associated with the one of the plurality of user identifiers.

A second exemplary embodiment of the present disclosure provides an apparatus for enrollment. The apparatus includes at least one processor and a memory storing computer instructions executable by the at least one processor, wherein the memory with the computer instructions and the at least one processor are configured to cause the apparatus to at least receive one of a plurality of predetermined user identifiers, the apparatus having access to the plurality of predetermined user identifiers stored in a memory. The memory with the computer instructions and the processor are configured to further cause the apparatus to create a biometric template corresponding to at least one biometric scans of the user, and store the created biometric template, wherein the created biometric template is associated with the one of the plurality of user identifiers.

A third exemplary embodiment of the present disclosure provides a non-transitory computer-readable medium tangibly storing computer program instructions which when executed by a processor, cause the processor to at least receive one of a plurality of predetermined user identifiers, the processor having access to the plurality of predetermined user identifiers stored in a memory. The computer program instructions further cause the processor to create a biometric template corresponding to at least one biometric scans of the user, and store the created biometric template, wherein the created biometric template is associated with the one of the plurality of user identifiers.

The following will describe embodiments of the present disclosure, but it should be appreciated that the present disclosure is not limited to the described embodiments and various modifications of the invention are possible without departing from the basic principles. The scope of the present disclosure is therefore to be determined solely by the appended claims.

BRIEF DESCRIPTION OF THE SEVERAL VIEWS OF THE DRAWING(S)

FIG. 1 presents a simplified signaling diagram between devices suitable for use in practicing exemplary embodiments of this disclosure.

Figure 2:
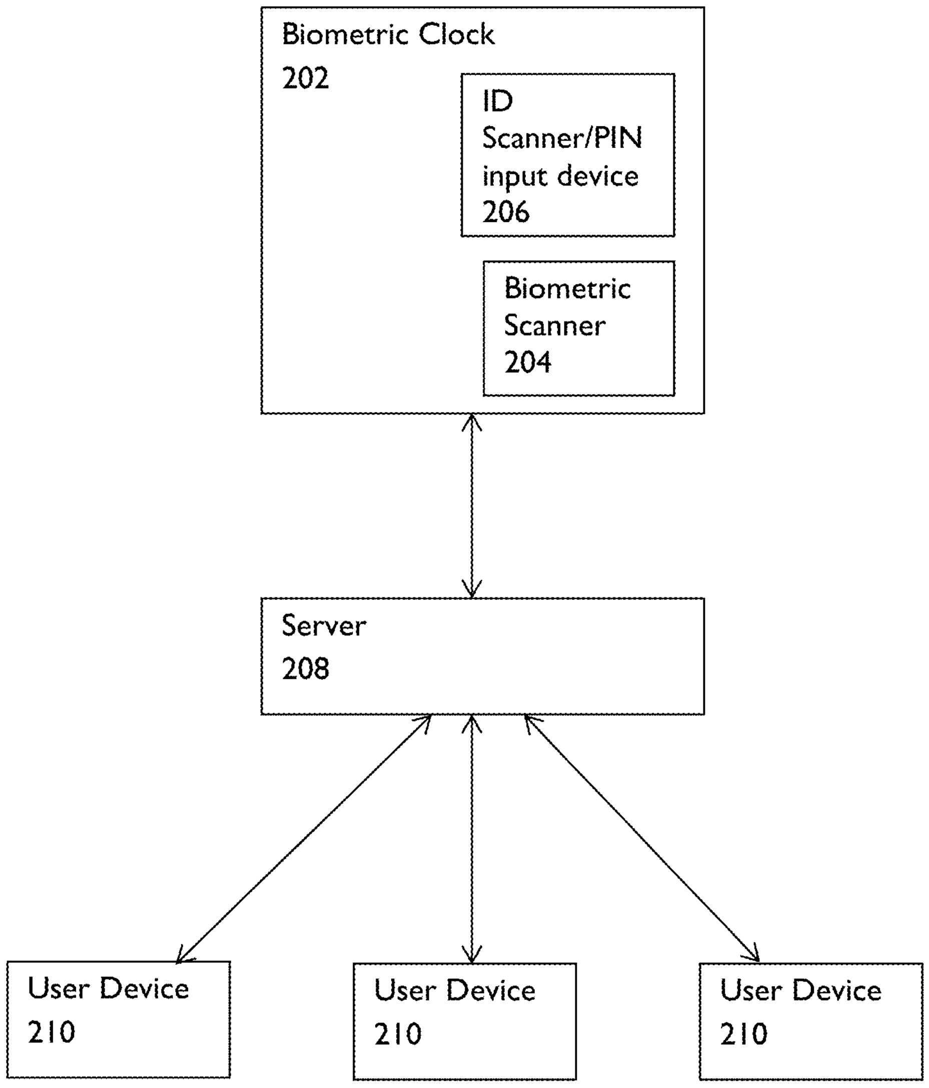

FIG. 2 presents an alternative arrangement of a simplified signaling diagram between the devices suitable for use in practicing exemplary embodiments of this disclosure.

Figure 3:
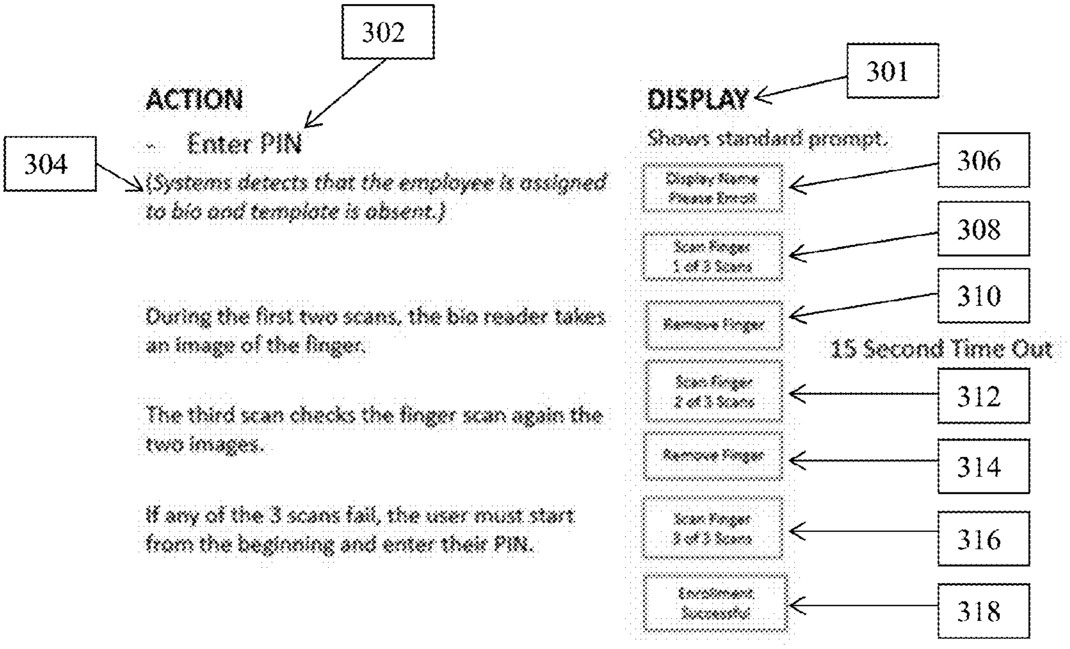

FIG. 3 presents an exemplary method diagram suitable for use in practicing exemplary embodiments of this disclosure.

Figure 4:
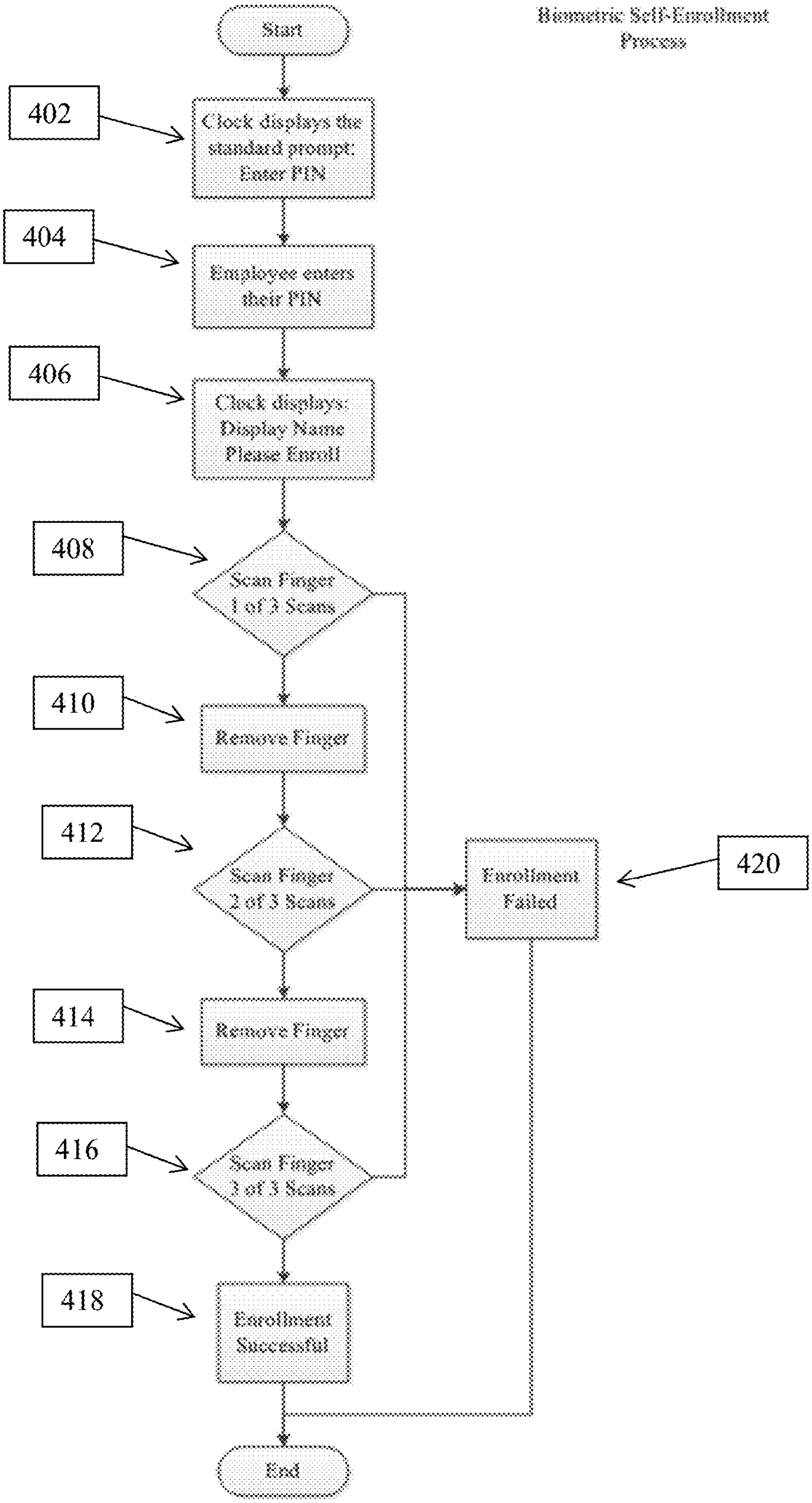

FIG. 4 presents an exemplary flowchart suitable for use in practicing exemplary embodiments of this disclosure.

Figure 5:
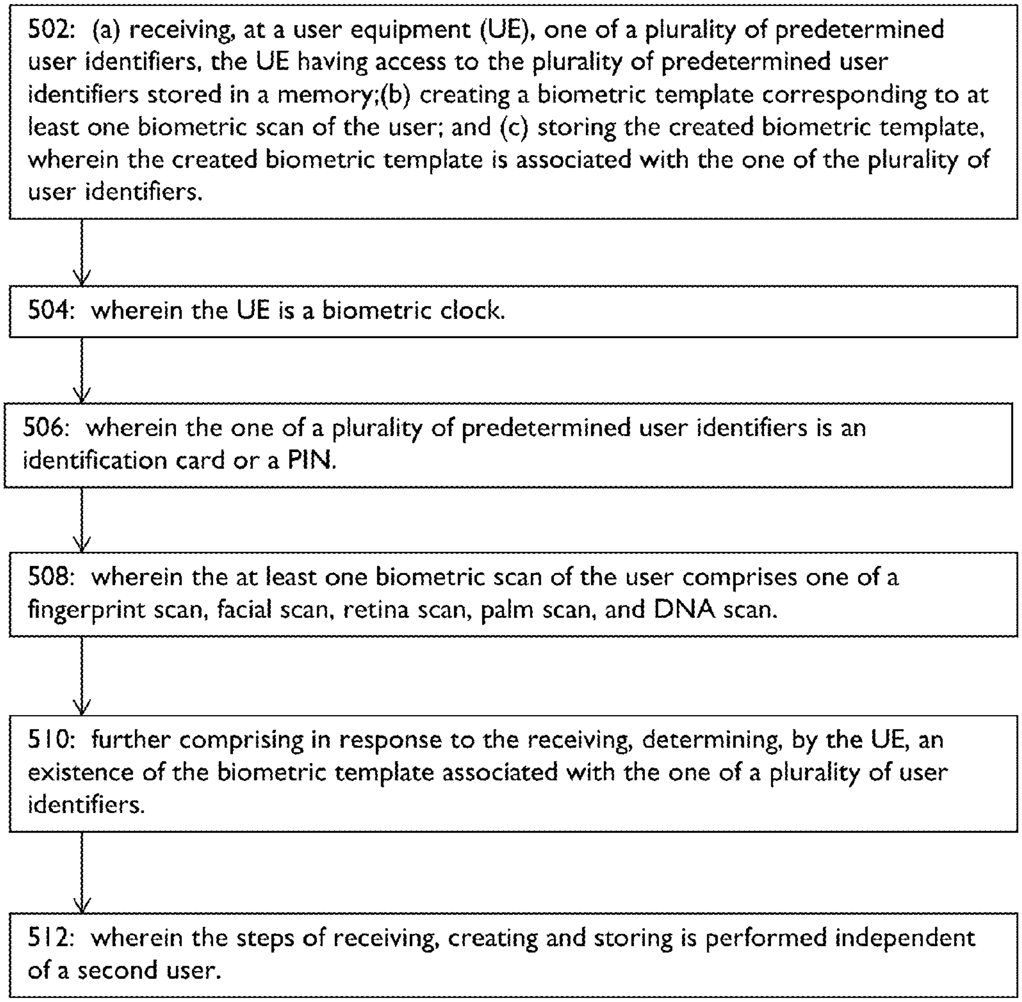

FIG. 5 presents a logic flow diagram in accordance with a method, apparatus, and computer-readable medium for performing exemplary embodiments of this disclosure.

Figure 6:
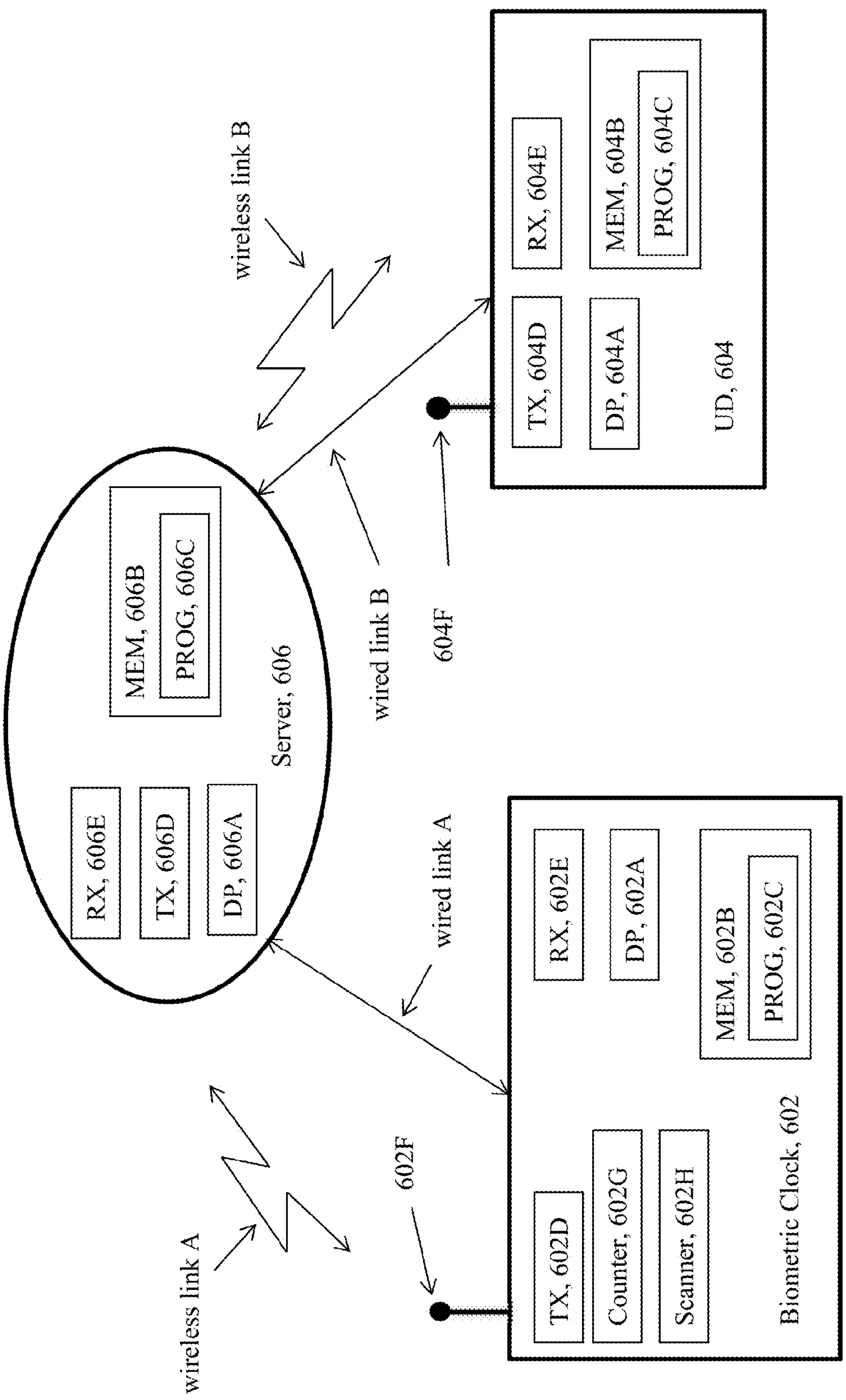

FIG. 6 presents a simplified block diagram of the devices suitable for use in practicing exemplary embodiments of this disclosure.

DETAILED DESCRIPTION OF THE INVENTION

It is often important for companies to monitor and police who has access to their facilities or access to particular parts of their facility. Additionally, it is also important for a company to be able to monitor and verify when a particular employee or individual begins working and stops working. For instance, most factories or assemblies attempt to keep track of when an employee, paid at an hourly rate, begins a certain shift and then ends that same shift. This allows the employer to appropriately track who is working and their appropriate pay.

One method of keeping track of when a particular employee is working is through the use of time cards.

Typically, a time card is "punched" by a clock with the time when the employee begins a certain shift and is then "punched" again when the shift is finished. However, this system somewhat relies on the honesty of the employees in order to keep track of their hours. There is no inherent check on whether a certain employee is in fact "punching" their own time card and not "punching" his/her time card along with another employees' time card.

Exemplary embodiments of the present disclosure provide a solution that overcomes this problem through the use of biometric identification. Rather than use a time card to track when an employee begins a shift and ends a shift, exemplary embodiments of the present disclosure allow an employee to electronically "punch in" and "punch out" of their shift by verifying their identity with a form of biometric data. Some exemplary biometric characteristics include, but are not limited to, fingerprints, palm veins, face recognition, DNA, palm prints, hand geometry, iris recognition, and retinas.

However, in order to implement a biometric identification system, an enrollment process must occur first so that an employee's biometric information is available for verification when they "punch-in" or "punch-out" of a shift. Exemplary embodiments of the enrollment processes can involve scanning a user's biometric data (e.g., a user's fingerprint) and associating it with that user's identity in a local system. During this enrollment process, a biometric template can be created from the user's biometric scan. The biometric template will then be stored as a biometric record for that particular user. The biometric template includes a digital (or analog) reference of distinct characteristics that correspond to or have been extracted from a biometric sample such as the above listed biometric identifiers. However, this process requires the aid of a supervisor to ensure the person enrolling the biometric parameter is the correct person. Accordingly, a supervisor or person with access to the user's biometric records must be present during the enrollment process to provide access to administrative type options that allow for the storing of a biometric record associated with the employee or user as well as ensure the presenting individual is properly identified.

The enrollment process for biometric identification is for a number of reasons the biggest complaint that users or employees have of a biometric authentication system. First, biometric systems require an on-site administrator for enrollment. This is often arduous and time consuming for the system administrator. Moreover, this issue is compounded for companies with large work forces. Second, biometric systems at remote work sites require the manager or person with access to travel to the remote work site or provide administrative rights to an on-site employee in order to complete the enrollment process. Third, enrollment in most cases must be scheduled ahead of time for both system administrators and employees to be on-site at the biometric clock for the enrollment process.

Exemplary embodiments of the present disclosure provide a biometric system that is preconfigured with a user identifier, such as but not limited to employee identification (ID) numbers. Each of the employees within the system are assigned to the biometric entry option by default. Exemplary embodiments allow a supervisor/manager or third party to simply provide the employees with their user identifier, such as employee ID number or a PIN number. Upon entering the ID or PIN numbers on the time clock or biometric clock for the first time, employees are prompted to enroll their fingerprint or other biometric data in the time clock or biometric clock. A fingerprint, biometric data or other biometric template is then saved under their employee ID or PIN number and the employee is enrolled on that time clock or biometric clock for biometric entry.

While exemplary embodiments of this disclosure affords the supervisors/managers or persons with appropriate access with the convenience of not having to be present at the biometric clock for the employees to be enrolled, it is also a quick, easy and simple process for the employees.

Exemplary embodiments of the present disclosure provide a user with one of the preconfigured user identifier such as ID numbers from a time clock or biometric clock. The clock displays the standard prompts, which are Enter PIN, Wave Badge, Scan Finger in rotation. Employees enter their PIN at the biometric terminal, the employee is walked through the process of scanning their finger three times for enrollment. A biometric template is created using standard biometric technology.

Referring to FIG. 1, provided is a simplified signaling diagram between devices suitable for use in practicing exemplary embodiments of this disclosure. Shown in FIG. 1 is a biometric clock 102, biometric scanner 104, ID Scanner/PIN input device 106, server 108, and user device 110. Exemplary embodiments of biometric scanner 104 are able to scan a user's biometric data and send the biometric data to biometric clock 102. Exemplary embodiments of biometric scanner 104 are also able to send and receive data or communications from biometric clock 102. The communication with biometric clock 102 can be through wired or wireless types of communication. Exemplary biometric data includes, but is not limited to, fingerprints, palm veins, face recognition, DNA, palm prints, hand geometry, iris recognition, and retinas. Exemplary embodiments of biometric scanner 102 include a processor, memory with computer program instructions, a display, and an input device for scanning of the user's biometric data.

Exemplary embodiments of ID Scanner/PIN input device 106 are able to scan a user's ID card or provide a means for a user to input a PIN number. For example, ID Scanner/PIN input device 106 can include magnetic strip scanners, barcode scanners, QR readers, and other types of scanning technology known in the art. Additionally, exemplary embodiments of ID Scanner/PIN input device 106 can include a generic keypad known in the art that allows a user to input a personalized sequence of numerical or alpha numeric digits. Exemplary embodiments of ID Scanner/PIN input device 106 are able to receive and transmit communications or data either wired or wirelessly with biometric clock 102. Exemplary embodiments of ID Scanner/PIN input device 106 include a processor, memory with computer program instructions, a display, and an input device to allow a user to input a PIN. In another exemplary embodiment ID Scanner/PIN input device 106 does not include a display.

Exemplary embodiments of biometric clock 102 are able to keep time digitally or through analog means. Exemplary embodiments of biometric clock 102 are also able to communicate, transmit and receive data from biometric scanner 104, ID scanner/PIN input device 106, and server 108. Exemplary embodiments of biometric clock 102 are able to literally stamp, digitally time stamp, or mark a biometric scan, an ID scan, or an inputted PIN with the time that the scan or input is received. Exemplary embodiments of biometric clock 102 include a processor, a memory with computer program instructions, a display, and a counter.

Exemplary embodiments of server 108 include any type of server that is known in the art. Exemplary servers 108 include one or multiple processors, memories, transmitters and receivers for transmitting and receiving data wired or wirelessly. Exemplary embodiments of server 108 include a single server and multiple servers. Exemplary embodiments of server 108 can include servers that are publically accessible (e.g., Drop Box, Google Drive) or private servers that can only be accessed by a finite number of entities that are connected to server 108. Exemplary embodiments of server 108 are able to communicate or transmit and receive data wired or wirelessly from biometric clock 102 and user device 110.

In an alternative exemplary embodiment, server 108 may be integral, internal, or a component of biometric clock 102. In this alternative exemplary embodiment, biometric clock 102 is able to communicate directly with user device 110 through a wired or wireless connection.

Exemplary embodiments of user device 110 include any type of electronic device or user equipment (UE) that can itself maintain data and is capable of wired or wireless transmission of data. Exemplary embodiments of user device 110 include a process, input/output interface such as a display, a memory, a transmitter, and a receiver for transmitting and receiving data wired or wirelessly. Exemplary embodiments of user device 110 include tablets, laptop computers, desktop computers, and portable electronic devices. Exemplary embodiments of user device 110 are able to maintain a list of employees and their associated biometric data. Exemplary embodiments of user device 110 are able to communicate or transmit and receive data from server 108. Exemplary embodiments of user device 110 are able to receive biometric data from biometric scanner 104 through biometric clock 102 and "punches" from biometric clock 102 in order to determine that a certain user has "punched-in" or "punched-out". Exemplary embodiments of user device 110 are also able receive biometric data and associate the biometric data with a particular user in order for the user to "punch-in" and "punch-out" at some later date.

Referring to FIG. 2, presented is an alternative arrangement of a simplified signaling diagram between the devices suitable for use in practicing exemplary embodiments of this disclosure. Shown in FIG. 2 are biometric clock 202, biometric scanner 204, ID scanner/PIN input device 206, server 208, and three user devices 210. In this exemplary embodiment ID scanner/PIN input device 206 and biometric scanner 204 are integral or a part of biometric clock 202. Accordingly, in this embodiment biometric clock 202, ID scanner/PIN input device 206 and biometric scanner 204 are a single device that is able to communicate or transmit and receive data from server 208. Additionally, in this exemplary embodiment, biometric clock 202 may contain a single processor and memory or it may contain multiple processors and memories. In other exemplary embodiments, one or both 204 and 206 may be separate devices from biometric clock 202 that are also able to communicate with biometric clock 202.

Also shown in FIG. 2 are three user devices 210, each of which are able to communicate or transmit and receive data from server 208. It should be noted that while this embodiment depicts three user devices 210, exemplary embodiments of this disclosure contemplate a single user device 210 or multiple user devices 210 that are able to communicate with server 208 and obtain and verify a user's biometric data from biometric clock 202.

It should be appreciated that in both FIG. 1 and in FIG. 2, none of the elements described are required to be in the same physical location. For instance, biometric clock 102, 202 may be located at facility A, while server 108, 208 may be located at facility B, and user device 110, 210 may be located at facility C. Likewise, some or all of the elements described in FIG. 1 and in FIG. 2 may be located at the same location while others are located at different locations. For instance in one alternative exemplary embodiment, server 208 may be integral, internal, or a component of biometric clock 202. In this alternative exemplary embodiment, biometric clock 202 is able to communicate directly with user devices 210 through a wired or wireless connection. Accordingly, the operability of exemplary embodiments of FIG. 1 and FIG. 2 are not dependent on the elements being located in the same vicinity or location provided they are connected wired or wirelessly to one another.

Referring to FIG. 3, presented is an exemplary method diagram suitable for use in practicing exemplary embodiments of this disclosure. The method begins at step 302, wherein a user enters a predetermined user identifier such as a user specific PIN. Exemplary embodiments of a predetermined user specific PIN includes any type of text, numeric or alpha numeric combinations that have been assigned to a specific user. The system will then detect or determine that the predetermined user specific PIN does not have an associated biometric template at step 304. If the predetermined user specific PIN has an associated biometric template the user will be prompted for the appropriate biometric scan for user verification.

In other words, exemplary embodiments of the present disclosure contemplate that each user or employee can be given a predetermined user identifier, such as a specific PIN or identification card that is unique to the user or employee. In one embodiment the database of predetermined user specific PINs or identification cards will be maintained on server 108, user device 110, biometric clock 102, or some other remote device that maintains the database. It can then be determined from the database of predetermined user specific PINs or identification cards whether a biometric template has been associated with the user or predetermined user specific PIN or identification card.

Once it is determined that there is no predetermined user specific PIN, the user will be shown a prompt 306 indicating they are required to enroll and have a biometric template associated with their predetermined user specific PIN. Exemplary embodiments of the present disclosure provide that the display 301 may be part of a biometric clock, biometric scanner, or other electronic device that allows a user to view prompts and to enroll and associate their biometric data with their predetermined user specific PIN.

Next, for the case that the biometric template is a fingerprint scan, the user will be prompted at step 308 for a scan of their fingerprint. The fingerprint can be scanned for the first time by a biometric scanner. At step 310, the user will be prompted to remove their finger. At step 312, the user's fingerprint will be scanned for the second time by a biometric scanner. In some embodiments as indicated in FIG. 1, the user will need to wait at least 15 seconds before the second scan. In other exemplary embodiments, the user will simply be required to remove their finger and pause for a specified amount of time before being prompted with step 312. In another exemplary embodiment, the user will not be required to wait or pause before being prompted with step 312. During the first two scans, the biometric scanner will be taking an image of the user's fingerprint.

Next, at step 314, the user will remove their finger from the biometric scanner. Then at step 316, the user will apply their finger again and have their fingerprint scanned by the biometric scanner a third time. The third scan of the user's fingerprint will be used by the system as a check against the first two fingerprint scans for accuracy. If the third scan fails to correspond so a certain degree of accuracy with the first two fingerprint scans, the user will be prompted to restart the process at step 306 or 308. If the third fingerprint scan matches the two prior fingerprint scans then the user will be prompted at step 318 that the user has successfully enrolled in the process.

In the embodiment shown in FIG. 3, the user's fingerprint is scanned three (3) times during this process, however, exemplary embodiments of this disclosure provide that the user's fingerprint can be scanned from one (1) to more than three (3) times in order to properly obtain a scan of the user's fingerprint.

It should be appreciated that exemplary embodiments of this process depicted in FIG. 3 can be used for other types of biometric identification. For instance, the process or similar process illustrated in FIG. 3 can be employed for other forms of biometrics, such as palm veins, face recognition, DNA, palm prints, hand geometry, iris recognition, and retinas.

Referring to FIG. 4, presented is an exemplary flowchart suitable for use in practicing exemplary embodiments of this disclosure. Exemplary embodiments of the flowchart depicted in FIG. 4 can be accomplished by the elements previously described in FIG. 1 and FIG. 2. The flowchart shown in FIG. 4 begins at block 402, wherein a clock (e.g., biometric clock) displays a standard prompt requesting that a user enter their PIN. Exemplary embodiments of the PIN include any type of text, numeric or alpha numeric combinations that have been assigned to a specific user.

At block 404, the user enters their PIN. This can be performed at the biometric clock or at a user input device that can communicate or is attached to a biometric clock. In one exemplary embodiment, the PIN is input through the use of a user ID card scanner. At block 406, the clock or biometric clock will display the name of the user associated with the scanned or inputted PIN. The biometric clock with or without the use of system records will attempt to verify whether the user has an associated biometric template for verifying the identity of the user. If the user does not have an associated biometric template, the user will be instructed to enroll at block 406. At block 408, the user will have their biometric identifier scanned. In this instance, as depicted in FIG. 4, the user will scan their fingerprint. At block 410 the user be instructed to remove their finger. At block 412, the user will then be prompted to replace their finger and their fingerprint will be scanned. At block 414, the user will again be instructed to remove their finger. Then at block 416 the user will be prompted to replace their finger and their fingerprint will be scanned for a third time.

If any of the scans at blocks 408, 412, or 416 fails due to an improper scan or other technical difficulties, the process will fail. The user will be prompted that the enrollment failed at block 420 and the process will end and the user will be forced to begin the enrollment from the start again. If all three scans at blocks 408, 412, and 416 produce useable scans of the user's fingerprint then the process will proceed to block 418 and the user will be notified that the enrollment is successful. Throughout the process set forth in blocks 402 through 420, the user is the only individual required to make inputs to complete the enrollment process. There is no need for a supervisor, manager, third party or second user to interact with the process or system in order for the enrollment process to be completed.

Referring to FIG. 5, presented is a logic flow diagram in accordance with a method, apparatus, and computer-readable medium for performing exemplary embodiments of this disclosure. Block 502 presents (a) receiving, at a user equipment (UE), one of a plurality of predetermined user identifiers, the UE having access to the plurality of predetermined user identifiers stored in a memory; (b) creating a biometric template corresponding to at least one biometric scan of the user; and (c) storing the created biometric template, wherein the created biometric template is associated with the one of the plurality of user identifiers. Then block 504 specifies wherein the UE is a biometric clock.

Some of the non-limiting implementations detailed above are also summarized at FIG. 5 following block 504. Block 506 relates to wherein the one of a plurality of predetermined user identifiers is an identification card or a PIN. Block 508 then further specifies wherein the at least one biometric scan of the user comprises one of a fingerprint scan, facial scan, retina scan, palm scan, and DNA scan. Block 510 states that the method further comprising in response to the receiving, determining, by the UE, an existence of the biometric template associated with the one of a plurality of user identifiers. Block 510 then specifies wherein the steps of receiving, creating and storing is performed independent of a second user.

The logic diagram of FIG. 5 may be considered to illustrate the operation of a method, a result of execution of computer program instructions stored in a computer-readable medium. The logic diagram of FIG. 5 may also be considered a specific manner in which components of the device are configured to cause that device to operate, whether such a device is a clock, biometric clock, electronic device, laptop, tablet, desktop or other device, or one or more components thereof. The various blocks shown in FIG. 5 may also be considered as a plurality of coupled logic circuit elements constructed to carry out the associated function(s), or specific result of strings of computer program instructions or code stored in memory.

Various embodiments of the computer-readable medium include any data storage technology type which is suitable to the local technical environment, including but not limited to semiconductor based memory devices, magnetic memory devices and systems, optical memory devices and systems, fixed memory, removable memory, disc memory, flash memory, dynamic random-access memory (DRAM), static random-access memory (SRAM), electronically erasable programmable read-only memory (EEPROM) and the like. Various embodiments of the processor include but are not limited to general purpose computers, special purpose computers, microprocessors digital signal processors and multi-core processors.

Reference is now made to FIG. 6 for illustrating a simplified block diagram of the various electronic devices and apparatus that are suitable for use in practicing exemplary embodiments of the present disclosure. Shown in FIG. 6 is biometric clock 602, server 606, and user device (UD) 604. Server 606 is adapted for communication over wireless link A or wired link A with biometric clock 602. Similarly, server 606 is adapted for communication over wireless link B or wired link B with UE 604. Exemplary embodiments of server 606 include a single server or a plurality of servers.

Biometric clock 602 may include processing means such as a processing system and/or at least one data processor (DP) 602A, storing means such as at least one computer-readable medium or computer-readable memory (MEM) 602B storing at least one computer program (PROG) 602C, and also communicating means such as a transmitter (TX) 602D and receiver (RX) 602E for bidirectional wired or wireless communications with server 606 and/or UD 604 and/or other UD's (not shown) via one or more antennas 602F as known in the art. Biometric clock 602 further includes a counter 602G for keeping time and a scanner 602H for scanning a user's biometric data.

Server 606 includes processing means such as a at least one data processor (DP) 606A, storing means such as at least one computer-readable memory (MEM) 606B storing at least one computer program (PROG) 606C, and communicating means such as a transmitter (TX) 606D and a receiver (RX) 606E for bidirectional wired or wireless communications with other devices known in the art.

UD 604 includes processing means such as at least one data processor (DP) 604A, storing means such as at least one computer-readable memory (MEM) 604B storing at least one computer program (PROG) 604C, and communicating means such as a transmitter (TX) 604D and a receiver (RX) 604E for bidirectional wired or wireless communications with other devices via one or more antennas 604F as known in the art.

Various embodiments of UD 604 can include, but are not limited to: laptop computers, desktop computers, mobile phones including smart phones, personal portable digital devices having wired or wireless communication capabilities including but not limited to laptop/palmtop/tablet computers.

At least one of the PROGs 602C or 604C in biometric clock 602 or UD 604 is assumed to include program instructions that, when executed by the associated DP 602A, 604A, enable the device to operate in accordance with embodiments of the present disclosure, as detailed above. Server 606 may also include software stored in its MEM 606B to implement certain aspects of these teachings. In these regards, embodiments of this disclosure may be implemented at least in part by computer software stored on the MEM 602B, 604B, 606B which is executable by DP 602A of biometric clock 602, DP 604 of UD 604, and/or DP 606A of server 606, or by hardware, or by a combination of tangibly stored software and hardware (and tangibly stored firmware). Electronic devices implementing these aspects of the disclosure need not be the entire devices as depicted in FIG. 6, but embodiments may be implemented by one or more components of same such as the above described tangibly stored software, hardware, firmware and DP.

Various embodiments of the computer readable MEMs 602B, 604B, and 606B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP's 602A, 604A, and 606A include but are not limited to general purpose computers, special purpose computers, microprocessors, digital signal processors (DSPs) and multi-core processors.

It is to be understood that any feature described in relation to any one embodiment may be used alone, or in combination with other features described, and may also be used alone, or in combination with one or more features of any other of the embodiments, or any combination of any other of the embodiments. The presently disclosed embodiments are therefore considered in all respects to be illustrative and restrictive. Furthermore, equivalents and modifications not described above may also be employed without departing from the scope of this disclosure, which is defined in the accompanying claims.

The invention claimed is:

1. A method of enrollment, the method comprising:

(a) receiving, at a user equipment (UE), one of a plurality of predetermined user identifiers, the UE having access to the plurality of predetermined user identifiers stored in a memory;

(b) in response to the receiving, determining whether a biometric template is associated with the one of the plurality of predetermined user identifiers;

(c) in response to determining an absence of an associated biometric template, creating a biometric template corresponding to at least one biometric scan of the user; and (d) storing the created biometric template, wherein the created biometric template is associated with the one of the plurality of user identifiers.

2. The method according to claim 1, wherein the UE is a biometric clock.

3. The method according to claim 2, wherein the one of a plurality of predetermined user identifiers is an identification card or a PIN.

4. The method according to claim 3, wherein the at least one biometric scan of the user comprises one of a fingerprint scan, facial scan, retina scan, palm scan, and DNA scan.

5. The method according to claim 1, wherein the steps of receiving, creating and storing is performed independent of a second user.

6. An apparatus for enrollment, the apparatus comprising at least one processor and a memory storing computer instructions executable by the at least one processor, wherein the memory with the computer instructions and the at least one processor are configured to cause the apparatus to at least:

(a) receive one of a plurality of predetermined user identifiers, the apparatus having access to the plurality of predetermined user identifiers stored in a memory;

(b) in response to the receiving, determine whether a biometric template is associated with the one of the plurality of predetermined user identifiers;

(c) in response to determining an absence of an associated biometric template, create a biometric template corresponding to at least one biometric scans of the user; and (d) store the created biometric template, wherein the created biometric template is associated with the one of the plurality of user identifiers.

7. The apparatus according to claim 6, wherein the apparatus is a biometric clock.

8. The apparatus according to claim 7, wherein the one of a plurality of predetermined user identifiers is an identification card or a PIN.

9. The apparatus according to claim 8, wherein the at least one biometric scan of the user comprises one of a fingerprint scan, facial scan, retina scan, palm scan, and DNA scan.

10. The apparatus according to claim 6, wherein the apparatus performs the steps of receiving, creating, and storing independent of a second user.

11. A non-transitory computer-readable medium tangibly storing computer program instructions which when executed by a processor, cause the processor to at least:

(a) receive one of a plurality of predetermined user identifiers, the processor having access to the plurality of predetermined user identifiers stored in a memory;

(b) in response to the receiving, determine whether a biometric template is associated with the one of the plurality of predetermined user identifiers;

(c) in response to determining an absence of an associated biometric template, create a biometric template corresponding to at least one biometric scans of the user; and (d) store the created biometric template, wherein the created biometric template is associated with the one of the plurality of user identifiers.

12. The non-transitory computer-readable medium according to claim 11, wherein the apparatus is a biometric clock.

13. The non-transitory computer-readable medium according to claim 12, wherein the one of a plurality of predetermined user identifiers is an identification card or a PIN.

14. The non-transitory computer-readable medium according to claim 13, wherein the at least one biometric scan of the user comprises one of a fingerprint scan, facial scan, retina scan, palm scan, and DNA scan.

15. The non-transitory computer-readable medium according to claim 11, wherein the processor performs the steps of receiving, creating, and storing independent of a second user.

* * * * *